(12) United States Patent
Skoff et al.

(10) Patent No.: US 6,497,262 B1
(45) Date of Patent: Dec. 24, 2002

(54) AUTOMOBILE WHEEL UNIT WITH TIRE INFLATION SYSTEM

(75) Inventors: Gerhard Skoff, Vienna (AT); Heinz Christely, Neubau (AT); Alfred Strasser, Wiesen (AT); Andreas Krauss, Ribbesbüttel (DE)

(73) Assignees: Steyr-Daimler-Puch Spezialfahrzeug AG & Co.KG, Vienna (AT); Volkswagen AG, Wolfsburg (DE)

( * ) Notice: Subject to any disclaimer, the term of this patent is extended or adjusted under 35 U.S.C. 154(b) by 0 days.

(21) Appl. No.: 09/786,452

(22) PCT Filed: Sep. 10, 1999

(86) PCT No.: PCT/AT99/00221

§ 371 (c)(1),
(2), (4) Date: Mar. 2, 2001

(87) PCT Pub. No.: WO00/15450

PCT Pub. Date: Mar. 23, 2000

(30) Foreign Application Priority Data

Sep. 11, 1998 (AT) .................................................. 601/98

(51) Int. Cl.[7] .............................................. B60C 23/10
(52) U.S. Cl. ...................................... 152/415; 152/417
(58) Field of Search ................................ 152/415, 416, 152/417

(56) References Cited

U.S. PATENT DOCUMENTS

| 2,452,527 A | * 10/1948 | Peter |
| 2,634,781 A | * 4/1953 | Turek |
| 2,634,784 A | * 4/1953 | Fitch |
| 4,685,501 A | * 8/1987 | Williams |
| 5,261,471 A | * 11/1993 | Freigang et al. |

* cited by examiner

*Primary Examiner*—Russell D. Stormer

(57) ABSTRACT

A tire inflating system has the tire inflating source connected through the hub to the wheel by a pair of aligned axial holes in the hub and wheel. A movable tube piece in the axial hole in the wheel is formed with side openings and is engaged by a sealing ring in the axial hole in the wheel which also receives a seal pressed by a spring toward a mouth of that hole. The tube piece can hold the seal in an open position until the wheel is separated from the hub.

5 Claims, 3 Drawing Sheets

AUTOMOBILE WHEEL UNIT WITH TIRE INFLATION SYSTEM

CROSS REFERENCE TO RELATED APPLICATIONS

This application is a national stage of PCT/EP99/00221 filed Sep. 10, 2001 and based upon Austrian national application GM 601/98 filed Sep. 11, 1998 under the International Convention.

FIELD OF THE INVENTION

The invention concerns an automobile wheel unit with a tire inflation system consisting of a hub rotatably mounted in a wheel carrier and an axially-removable wheel, whereby the hub is connected via a rotational drive means to a tire inflation system, and the air flow is connected to the wheel via overlapping axial holes in the hub and wheel, and the axial hole in the wheel terminates in a chamber containing a seal.

BACKGROUND OF THE INVENTION

Such tire inflation systems serve to adjust the air pressure in tires. The required air connection between the hub and removable wheel is made via the overlapping axial holes. To prevent the air from escaping from the wheel when it is removed, a seal is usually provided in practice for wheeled tanks that is screwed against the mouth of the axial hole when the wheel is removed. This is impractical and easily forgotten.

OBJECT OF THE INVENTION

The object of the invention is to provide an air connection between the hub and wheel that independently closes when the wheel is removed so that pressure is not lost, even briefly.

SUMMARY OF THE INVENTION

This object is achieved according to the invention in that:
a) a spring is provided that presses the seal toward the mouth of the axial hole,
b) a moveable tube piece is provided in the axial hole in the wheel that has side openings inside the chamber, and
c) a sealing ring is inserted in the axial hole in the wheel that contact the tube piece.

The seal in a) is a spring-loaded valve that is tightly sealed by the pressure in the chamber. When the wheel is connected to the hub, the tube piece in b) presses the seal into an open position, and its side openings ensure that the air connection between the wheel and hub remains intact. The sealing ring in c) ensures that no pressure is lost.

In a preferred development of the invention, the spacing of the sealing ring from the mouth of the axial hole in the wheel is greater than the axial extension of the side openings of the tube piece. Accordingly when the wheel is removed, the tube piece is pressed into the axial hole of the wheel, and the side openings are inserted into the axial hole which does not pass the sealing ring. This ensures that no air escapes from the wheel when it is removed.

In one embodiment, the tube piece is fixed to the hub. In an alternative embodiment, the tube piece is fixed to or forms a single piece with the seal.

BRIEF DESCRIPTION OF THE DRAWING

The invention is described and explained hereinafter with reference to the accompanying drawing wherein.

SPECIFIC DESCRIPTION

Figure 1:
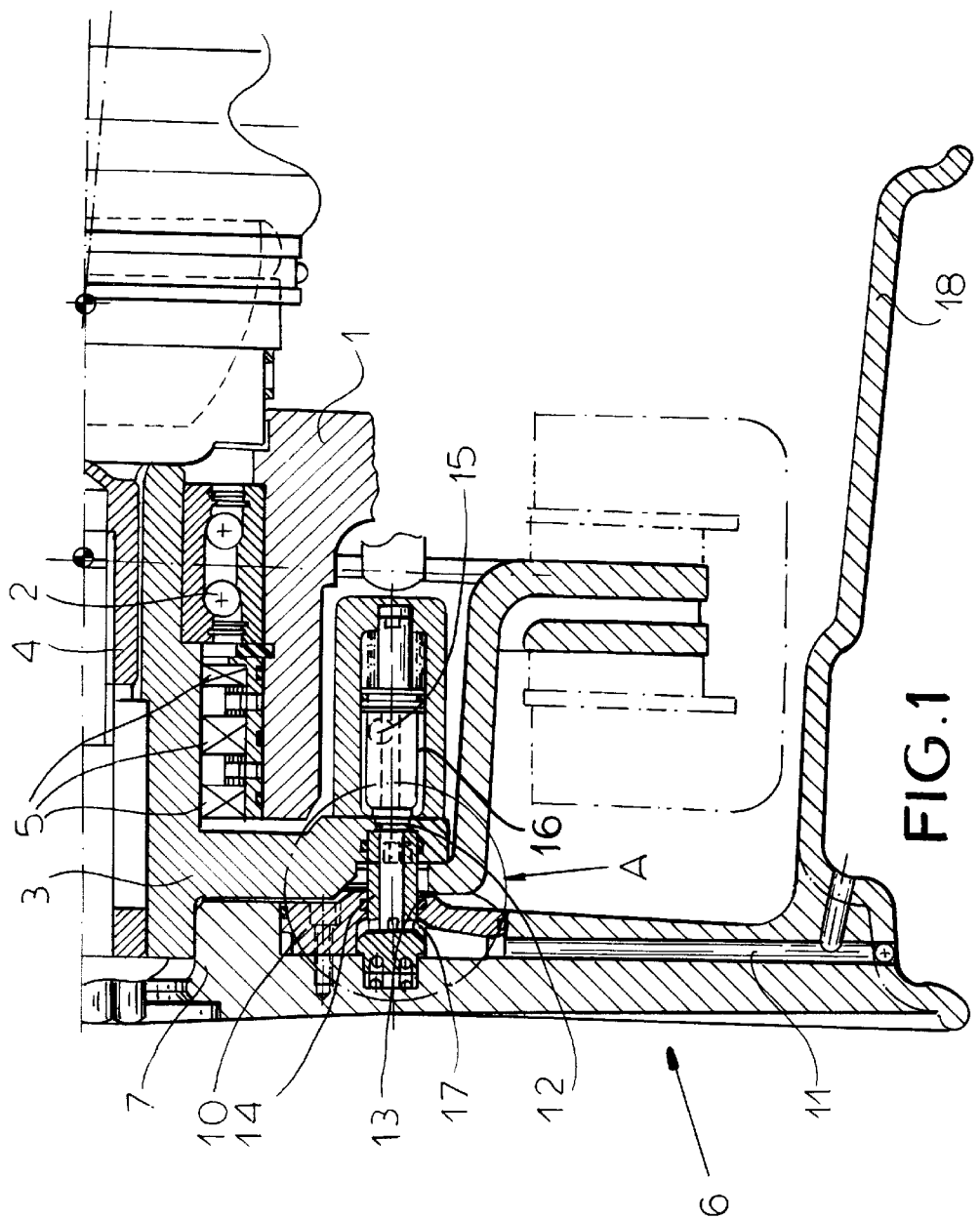
FIG. 1 is a partial axial section of a wheel unit according to the invention.

The wheel carrier 1 is only schematically portrayed in FIG. 1. It comprises the wheel bearing 2 in which a hub 3 is rotatably mounted and driven by a drive shaft 4. Inserted between the wheel carrier 1 and hub 3 are a number of sealing rings that form a rotational drive means 5. Attached in a prior-art manner to the hub is a wheel 6 that consists of a wheel disk and a rim 8. The wheel nuts that hold the wheel and the tire placed on the rim to the hub are not portrayed.

The inside of the wheel disk 7 contains an insert 10 to allow disassembly. The elements in the insert could also be in the wheel disk 7. Furthermore, the wheel disk has an air channel 11 that leads to the rim 8. There is at least one axial hole 12 in the hub 3, and there is another axial hole 13 (in the insert 10 in this case) in the wheel following the extension of the axial hole 12 or at least overlapping it. The two axial holes 12, 13 are connected by a tube piece 14. The air inlet or outlet from the tire inflation system located in the vehicle leads from the wheel carrier into the chambers of the rotational drive means 5 formed between the seals, passes from there via a control valve (not shown) attached to the hub 3, via an opening 15 in the housing of the filter 16 and through the filter 16, into the tube piece 14 via the axial hole 12 in the hub, via the axial hole 13 in the wheel into a chamber 17 in the insert 10, and finally through the air channel 11 to the rim 8.

Figure 2:
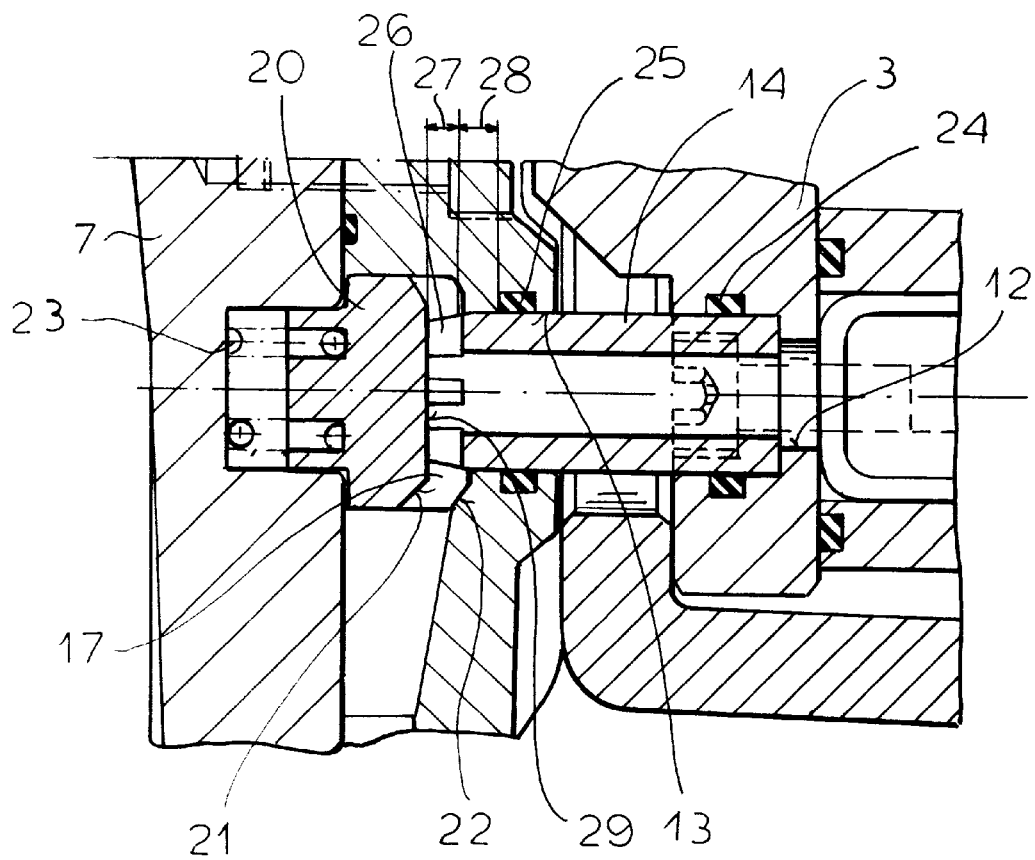
FIG. 2 is an enlargement of detail A in FIG. 1.

FIG. 2 shows the details of the air connection between the hub 3 and wheel 6 in a first embodiment. A seal 20 in the form of a circular-symmetrical plunger has a face with a slightly conical sealing surface 21 that interacts with an opposing surface 22 at the mouth of the axial hole 13 in the chamber 17 when the wheel is removed. The seal is pushed by a spring 23 in the closing direction. One end of the tube piece 14 sits tightly in the hub 3 or its axial hole 12. In addition, another seal 24 can be provided if the tube piece does not form a single piece with the hub. There is a seal 25 between the tube piece 14 and the axial hole 13 in the wheel. The end of the tube piece 14 facing the seal 20 has side holes 26 that form an air connection even when it contacts the face 29 of the seal 20. The axial extension of these openings 26 is identified with the number 27 and is smaller than the distance 28 between the mouth (surface) 22 and the start of the sealing ring 25. This ensures that when the wheel is removed (the tube piece 14 is removed from the hole 13 in the wheel), the seal is retained between the tube piece 14 and hole 13 until the sealing surface 21 sits on the mouth 22. When the wheel is removed, there is no time at which air can leave the wheel.

Figure 3:
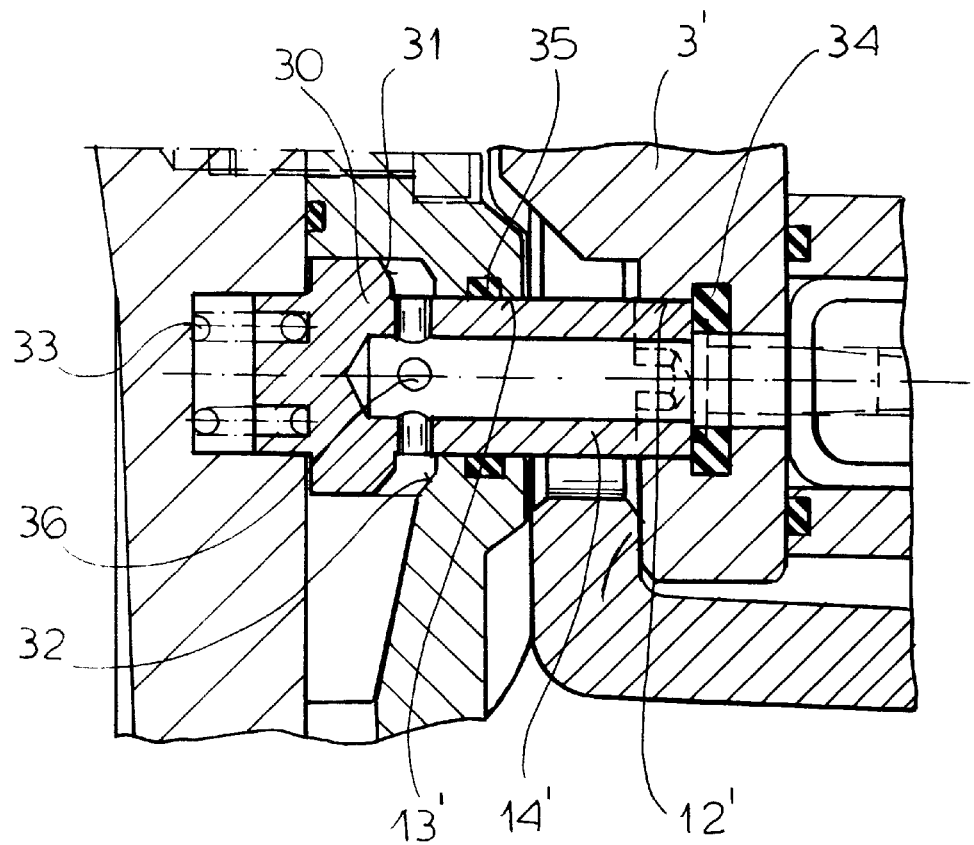
FIG. 3 is an enlargement of detail A in FIG. 1 in an alternative embodiment.

In FIG. 3, the seal 30 is designed as a single piece with the pipe or tube piece 14'. When the wheel is removed, the pipe or tube piece 14' is also removed from the hole 12' of the hub 3'. At the transition to the pipe or tube piece 14', the sealing piece 30 forms a shoulder 31 that is a sealing surface with reference to the mouth of the hole 13'. The spring 33 presses the entire sealing piece 30 against a seal 34 in the hub 3'. Between the tube piece 14' and the hole 13', there is a sealing ring 35 whose distance form the mouth 32 is greater than the diameter of the holes 35 of which there are four (for example) instead of the lateral holes.

What is claimed is:

1. An automobile wheel unit with a tire inflating system comprising:
   a hub rotatably mounted in a wheel carrier;
   a wheel that can be removed in an axial direction from said hub;
   a rotational drive means connecting said hub to said tire inflating system;
   means forming an air connection with the wheel and including overlapping axial holes in the hub and wheel for supplying air to the wheel the axial hole in the wheel terminating in a chamber containing a seal;
   a spring pressing the seal toward a mouth of the axial hole in said wheel;
   a moveable tube piece in the axial hole in the wheel and formed with side openings inside the chamber; and
   a sealing ring contacting the tube piece and received in the axial hole in the wheel.

2. The wheel unit according to claim 1 wherein a spacing of the sealing ring from the mouth of the axial hole in the wheel is greater than an axial extension of the side openings of the tube piece.

3. The wheel unit according to claim 1 wherein the tube piece is fixed to the hub.

4. The wheel unit according to claim 1 wherein the tube piece is connected to the seal.

5. The wheel unit according to claim 1 wherein the tube piece forms a single piece with the seal.

* * * * *